A. L. MUREN.
STORAGE BATTERY ELECTRODE.
APPLICATION FILED MAY 28, 1918.
1,315,032. Patented Sept. 2, 1919.
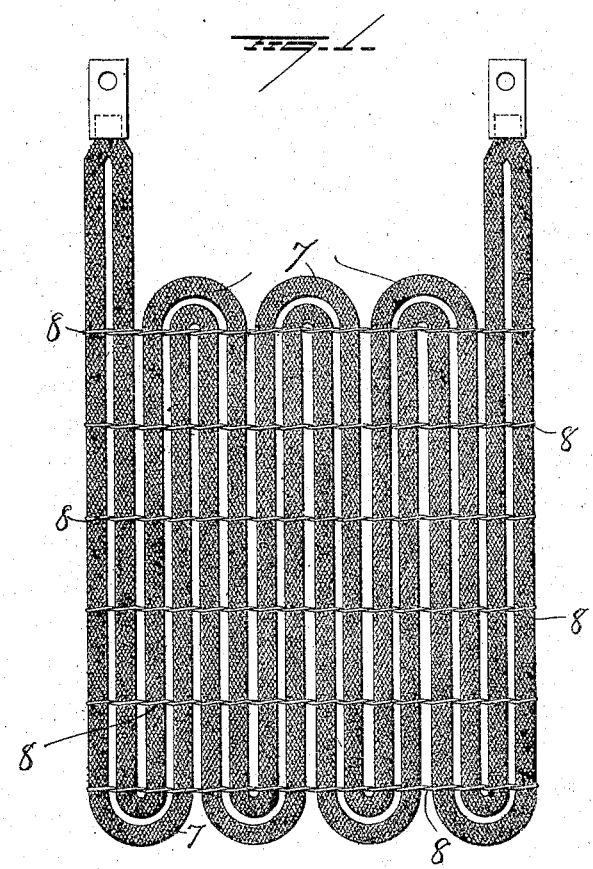
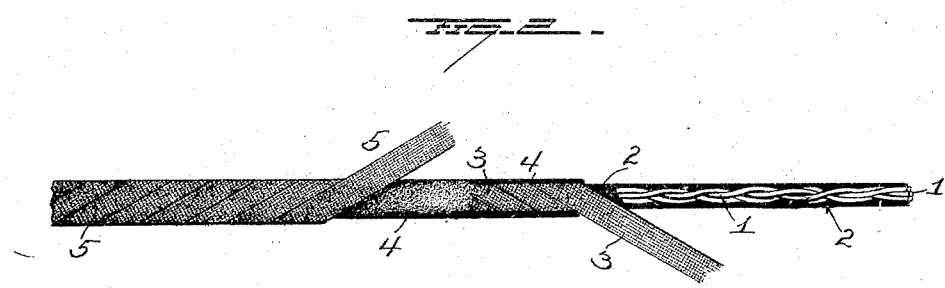
WITNESSES
INVENTOR
A. L. Muren
By Seymour & Bright
Attorneys

UNITED STATES PATENT OFFICE.

ALBERT L. MUREN, OF BURLINGTON, IOWA.

STORAGE-BATTERY ELECTRODE.

1,315,032.  Specification of Letters Patent.  Patented Sept. 2, 1919.

Application filed May 28, 1918. Serial No. 237,044.

*To all whom it may concern:*

Be it known that I, ALBERT L. MUREN, a citizen of the United States, and a resident of Burlington, in the county of Des Moines and State of Iowa, have invented certain new and useful Improvements in Storage-Battery Electrodes; and I do hereby declare the following to be a full, clear, and exact description of the invention, such as will enable others skilled in the art to which it appertains to make and use the same.

This invention relates to improvements in secondary battery electrodes and the method of making the same,—the object of the invention being to provide an electrode in which there shall be a maximum amount of surface exposed to the electro-chemical action for a given weight of metal; in which the conductivity of the electrode shall be maintained at a maximum due to superior electrical contact between the parts, and in which the mechanical strength, as well as conductivity shall be highly efficient.

With this and other objects in view, the invention consists in certain novel features of construction and novel steps in the process of making a battery electrode, as hereinafter set forth and pointed out in the claims.

In the accompanying drawings Figure 1 is a view of an electrode embodying my improvements; and Fig. 2 is an enlarged view partly in section showing the manner in which the elements of the electrode are formed.

In constructing my improved electrode, I first provide a conducting core member comprising a plurality of intertwisted or braided wires of metal or alloy suitable for the electrode. For example, the wires may be of nickel, nickel-plated or an alloy of nickel with iron or copper may be used for the positive electrode, and iron, cadmium, tin, zinc or galvanized iron may be used for the negative electrode. The braided wire core 1 is flexible and in its meshes, active material 2 consisting of a suitable metallic oxid or compound will be firmly embedded. This may be accomplished by passing the braided core through a suitable mold containing the active material in a plastic condition. Metal gauze in the form of a strip of fine mesh metallic gauze 3 and preferably constructed of the same character of metal as that composing the core member 1, is wound spirally, clockwise, on said core member, and the whole is then again passed through the mold containing the active material 2, whereby a coating 4 of such active material will be located around the gauze covering and pressed into the interstices thereof. Another strip 5 of metallic gauze will then be wound spirally counter-clockwise around the coating 4 and the latter will become pressed into the interstices of the gauze covering 5. If desired, the outer gauze covering may be again surrounded by active material and metallic gauze, and as many of such layers of gauze and active material may be employed as may be found desirable.

The cable above described may be made in any desired length and then cut in sections and assembled to form the completed electrode. For example sections of the cable may be placed side by side and folded back-and-forth so as to form a substantially flat plate or mat 7 as shown in Fig. 1, the folds being suitably bound together by means of binding wires 8.

Having fully described my invention what I claim as new and desire to secure by Letters-Patent, is:—

1. A battery electrode comprising a multiple metallic core member having active material distributed among the elements of said multiple core member, a metallic gauze covering inclosing said core member and active material, and active material contained in the interstices of said metallic gauze.

2. A battery electrode, having a core member consisting of intertwisted wires, active material coating said core and entering the interstices thereof, and metallic gauze wound spirally on said coated core and having active material incorporated in its interstices.

3. A battery electrode having a metallic core comprising intertwisted wires, a coating of active material on said core and entering the interstices thereof, a metallic gauze strip wound spirally in one direction on said coated core, and containing active material, a coating of active material inclosing said gauze covering, and a wire gauze strip wound spirally in the opposite direction, on said last-mentioned coating.

4. A battery electrode comprising a flexible cable having a multiple core containing active material, a coating of active material on said core, a covering of metallic gauze inclosing said coating and in contact therewith, a second coating of active material inclosing said metallic gauze covering, and a second covering of metallic gauze inclosing the second coating of active material, said cable being formed into a plate or mat, and binding means for the constituent layers or strands of said plate or mat.

5. The herein described method of making a battery electrode, consisting in embedding active material in the spaces formed by a plurality of wires constituting a core, and simultaneously coating said core with active material, covering said coated core with metallic gauze, coating said gauze with active material, causing the active material to enter the interstices of the gauze, and inclosing said last mentioned active material coating with metallic gauze in contact with said active material.

In testimony whereof, I have signed this specification in the presence of two subscribing witnesses.

ALBERT L. MUREN.

Witnesses:
CHARLES C. CLARK,
MARY FAWCETT.